(No Model.)

W. S. MILLER.
EGG CARRIER.

No. 303,309. Patented Aug. 12, 1884.

Witnesses
Charles G. Simpson
Charles L. Lawrence

Inventor
W. S. Miller

UNITED STATES PATENT OFFICE.

WALTER S. MILLER, OF MONTREAL, QUEBEC, CANADA.

EGG-CARRIER.

SPECIFICATION forming part of Letters Patent No. 303,309, dated August 12, 1884.

Application filed January 26, 1884. (No model.)

*To all whom it may concern:*

Be it known that I, WALTER SYME MILLER, of the city of Montreal, in the District of Montreal, Province of Quebec, Canada, have invented new and useful Improvements in Carriers for Eggs, &c.; and I do hereby declare that the following is a full, clear, and exact description of the same.

This invention has reference to an improved manner of constructing the egg, &c., carriers formed out of pasteboard, card-board, paper-board, and similar substances, or those formed out of thin sheets of material, to give them greater strength.

Figure 1:
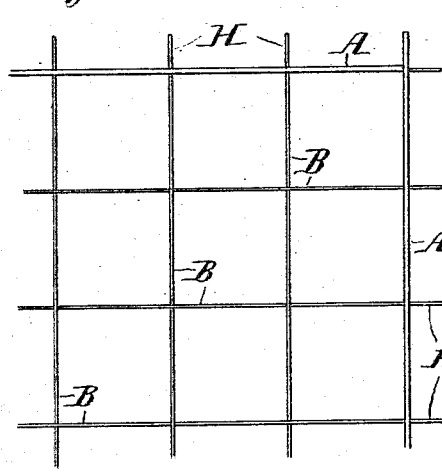
Figure 4:
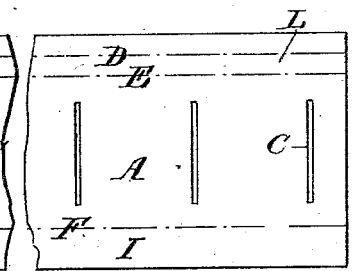
Figure 5:
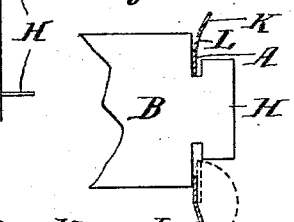
Figure 6:
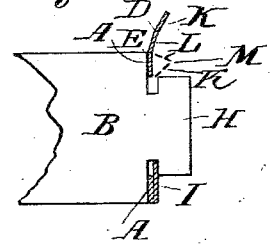
Figure 2:
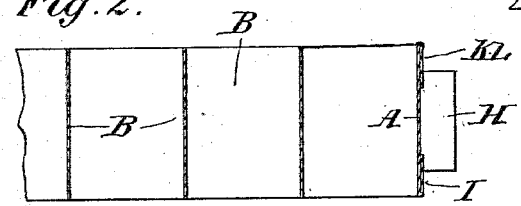
Figure 3:
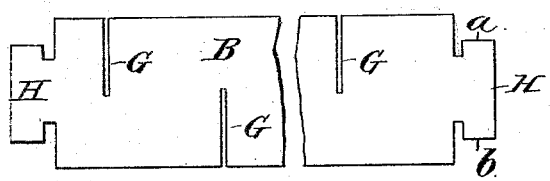

In the drawings hereunto annexed, similar letters of reference indicate like parts, and Figure 1 is a plan of a portion of an egg-carrier embodying my invention. Fig. 2 is a side elevation of the portion of the egg-carrier shown in Fig. 1. Fig. 3 is a side elevation of a portion of an intermediate part of the egg-carrier shown in Fig. 1. Fig. 4 is a side elevation of a portion of an outer part of the egg-carrier shown in Fig. 1. Figs. 5 and 6 show the manner of interlocking the outer and inner parts together.

Letter A designates the outer parts of the egg-carrier. B are the intermediate parts.

The manner of forming the outer parts, A, is shown in Fig. 4. Each of these consists of a strip of material cut to the required width, for the purposes hereinafter set forth, and any desired length, with openings C formed in it (the openings being equally distant from each other) the required distance and size, the distance being governed by the size of the chambers to be formed to receive each egg, &c.

D, E, and F are lines scored, nicked, or indented on the material to cause it to bend at the places where they are situated. One end of each of the parts A will be formed as shown in Fig. 4, while the other end will be provided with a "T-end," in the manner hereinafter described, for the ends of the parts B, also as shown in Fig. 4.

The manner of forming the intermediate parts, B, is shown in Fig. 3. These consist each of a strip of material cut of equal width to the depth that the chambers to receive the eggs, &c., are to be, which will be also equal to the width of that part of the parts A contained between the lines E and F in Fig. 1. They are provided with openings G, placed in distance apart longitudinally of the parts equal to the distances between the openings C. As shown they alternately extend from the top and bottom of the part or strip B; but they may all be cut from or extend from one side, if desired. Each of their ends is formed into a T-end, H. These heads are in perpendicular width (from *a* to *b*) equal to the length of the openings C.

After the parts or strips A and B have been constructed, as above described, they are built together to form an egg-carrier in the following manner: The ends H of all the strips B that are required to be passed through the openings C in the parts or strips A are placed therein and brought to the position shown in Fig. 5. The part I of the part A is then turned to the position shown in Figs. 2, 5, and 6. The T-ends H are then brought to the position shown in Fig. 6, and the parts K L of the strip A are first bent to the position shown by the dotted lines M in Fig. 6, and then to the position shown at K L in Fig. 2. By this means the necks N of the T-ends are held fairly between K, L, and I.

If desired, the parts K, L, and I may be pasted, &c., before turning them into position, as just above described, for although the sections A are very materially strengthened and stiffened by them, yet much more so if pasted, &c.

Although, as above, I have described my invention more particularly as applied to an egg-carrier, yet it may be used for any other carrier.

What I claim, and wish to secure by Letters Patent, is as follows:

1. The combination of the parts A, provided with openings C, and portions L, K, and I, with the parts B, provided with T-ends H, the whole constructed and arranged substantially as described and shown, for the purpose set forth.

2. The combination of the outer parts of an egg, &c., carrier, provided with openings and folding parts, as described, and interlocked with openings or recesses cut near the ends of the intermediate parts, substantially as and for the purposes set forth.

W. S. MILLER.

Witnesses:
 CHARLES G. C. SIMPSON,
 CHARLES L. LAWRENCE.